Aug. 10, 1965 R. C. R. THEIL 3,199,320
MACHINES FOR TREATING SKINS
Filed Oct. 31, 1963 3 Sheets-Sheet 3

INVENTOR
RICHARD CARL ROBERT THEIL

BY Linton and Linton
ATTORNEYS

United States Patent Office 3,199,320
Patented Aug. 10, 1965

3,199,320
MACHINES FOR TREATING SKINS
Richard Carl Robert Theil, Svenljunga, Sweden
Filed Oct. 31, 1963, Ser. No. 320,336
Claims priority, application Sweden, Nov. 10, 1962, 12,083/62
5 Claims. (Cl. 69—27)

The present invention relates to machines for treating the hair side of skins and of the kind comprising a rotatable cylinder having an uneven circumferential surface between which and a presser element the work piece is reciprocated in the direction of rotation of said cylinder with a feed velocity considerably lower than the peripheral velocity of the cylinder. During treatment in the machine which takes place following a chemical treatment of the piece of work and which is repeated a number of times, the work has hitherto been fed forwardly by hand and, after the presser element has been moved slightly away from the cylinder, the work has been pulled back by hand for repeating the treatment, and this work has been very heavy and has required great skill.

The present invention has for its object to overcome this inconvenience by providing a machine which does not require a great amount of skill and which is capable of a high rate of production.

A machine made in accordance with the invention is mainly characterized in that for supporting the work piece and moving it onto the presser element there is provided a blanket having one edge secured to a member which is provided with means for detachably securing the work piece and which is movable towards and away from said cylinder, the opposite edge of said blanket being influenced by a yielding force (delivered by a spring or a weight) which maintains the blanket under tension during its reciprocating movement. The yielding force acting on the blanket may preferably act upon a cylinder for winding the blanket up and off, and such cylinder may be connected with a drum on which there is wound up a wire which suspends a weight.

The member which is movable towards and away from the cylinder may comprise a beam which is parallel to the cylinder and secured to one end of each of two parallel arms having their other ends pivoted on two coaxial pins which are parallel to the cylinder. Two gear racks may be provided, each having one end pivotally connected to one of said arms, said racks meshing with gear wheels carried by a shaft which is driven by a reversible electric motor.

According to a preferred embodiment of the invention, said means for detachably securing the piece of work to said beam comprises a clamping bar which is parallel to said beam and swingably mounted thereon for being swung between two end positions by means of a hydraulic mechanism. In one end position said clamping bar clamps one edge portion of the work piece lying on the blanket against a fixed clamping member which is carried by the beam and which preferably is of channel-shaped cross-section.

One embodiment of the invention is illustrated in the accompanying drawings wherein.

Figure 1:
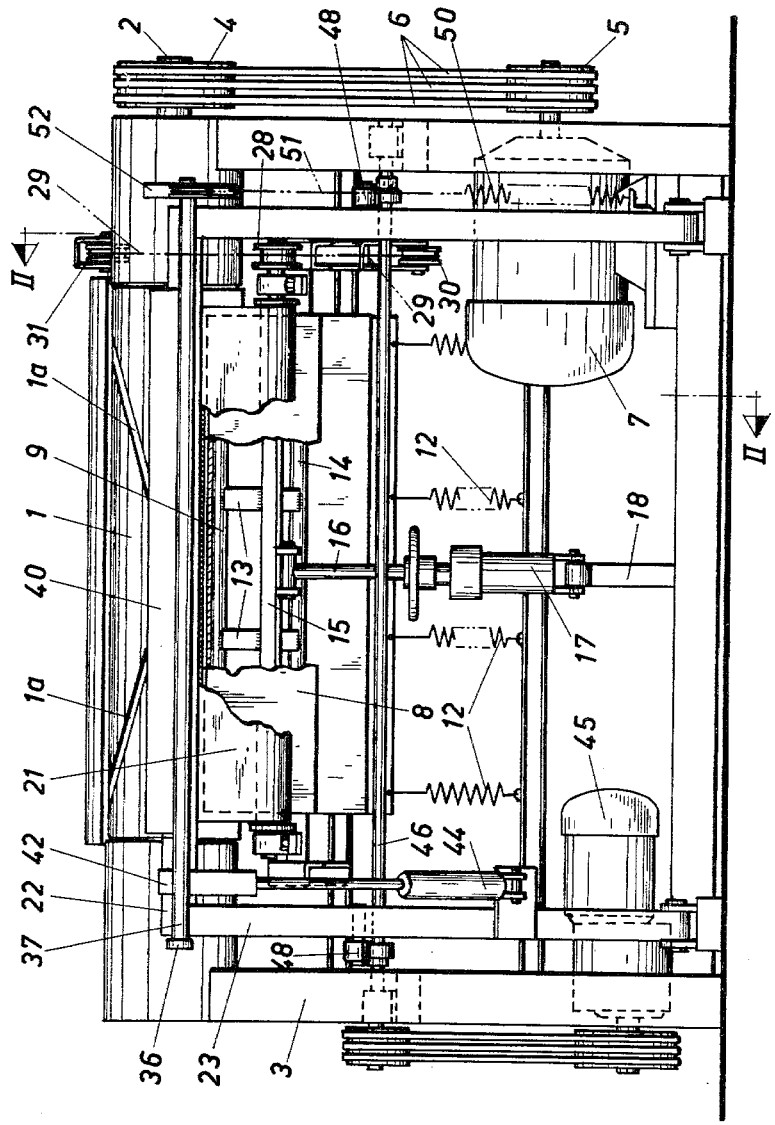
FIGURE 1 is a front elevation of the machine with certain parts broken away.

In the drawings, numeral 1 indicates the work cylinder of the machine. This cylinder is provided at its circumference with helically extending channels 1a, in a manner known per se. The shaft 2 of the cylinder is journalled in the supporting frame 3 of the machine and is driven by means of pulleys 4, 5 and belts 6 from an electric motor 7. For pressing the work piece against the cylinder 1 there is provided a bloster 8 disposed below the cylinder and being secured at its front end to a rod 9 parallel with the cylinder. The opposite end portion of said bolster extends partly around a rod 10 parallel to the cylinder, and a number of coil springs 12 are provided between the rear edge of the bolster 8 and a cross piece 11 for maintaining the bolster under tension. The first-mentioned rod 9 is secured to one end of each of a number of arms 13 which have their opposite ends secured to a shaft 14 rotatably journalled in the suporting frame, said arms further being supported by a rail 15 parallel to the cylinder 1. The piston rod 16 of a hydraulic pack is connected with its free end to said rail, the cylinder 17 of said jack being pivoted on a pin supported by a trestle 18. By means of the jack 16, 17 the bolster 8 may be moved from the lowered position shown in FIGURE 2 to the pressing position shown in FIGURE 3.

Figure 2:
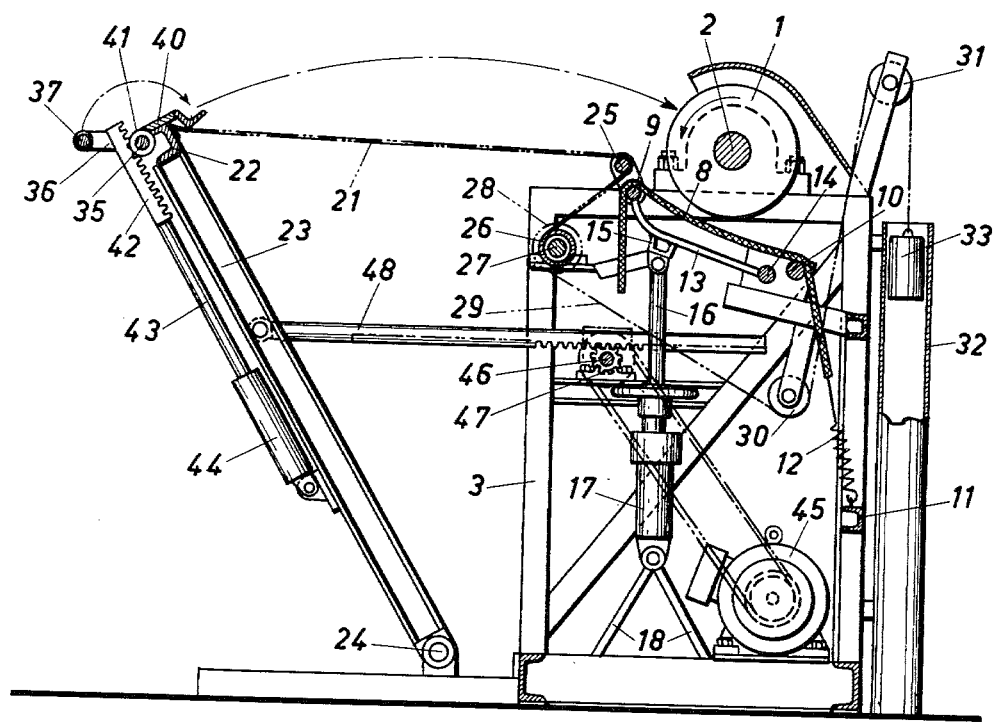
FIGURE 2 is a cross section substantially along the line II—II in FIGURE 1.
Figure 3:
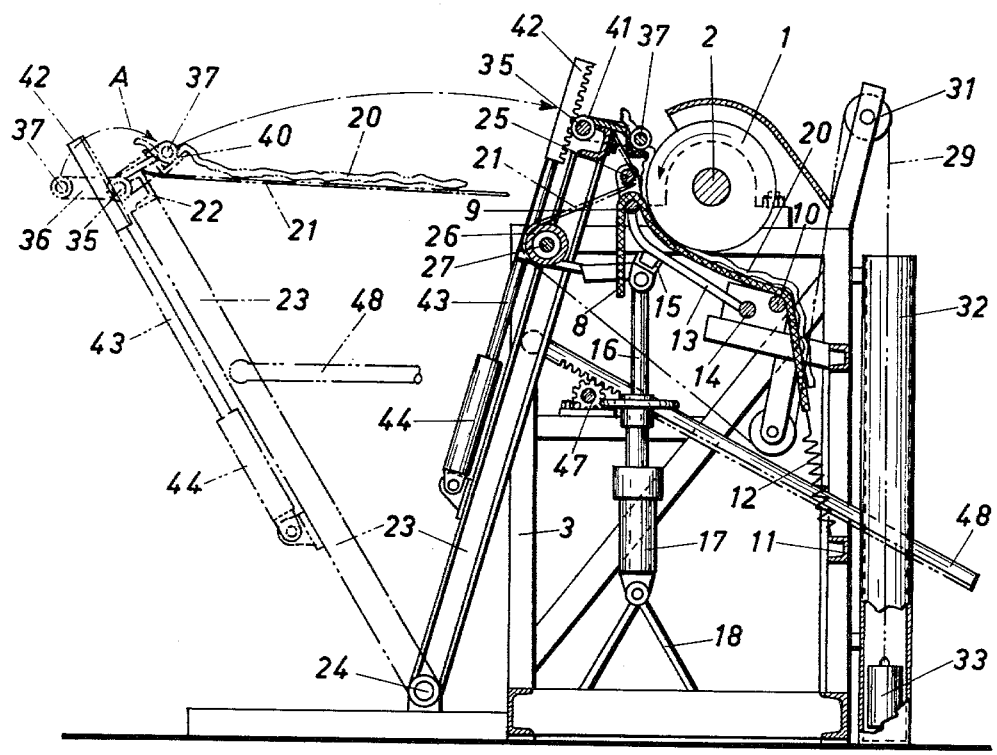
FIGURE 3 is a section substantially corresponding to FIGURE 2 but with certain elements of the machine shown in another position.

For supporting the work piece 20 there is provided a blanket or mat 21 which is secured at one edge to a beam 22 parallel to the cylinder 1, said beam being mounted at the upper ends of two arms 23 which are pivotally journalled on two coaxial pins 24 mounted at the lower end of the supporting frame, so that the beam 22 may be moved in a direction towards and away from the cylinder 1 from the position shown in FIGURE 2, and indicated in broken lines in FIGURE 3, to the position shown in full lines in FIGURE 3, and vice versa. From the beam 22 the blanket 21 extends partly around a deflection roller or bar 25 which is parallel to the rod 9 and movable together therewith, and from there the blanket passes onto a wind-up cylinder 26 which is secured to a shaft 27 rotatably journalled in the supporting frame. On one end of said shaft there is secured a wind-up drum 28 for a wire 29 which passes over a pulley 30 and from there extends upwardly and around a pulley 31 disposed behind the cylinder 1. That part of said wire which hangs down from the pulley 31 supports a weight 33 which is movable up and down in a tubular housing 32 and which maintains the blanket 21 under tension during the movements of the beam 22 towards and away from the cylinder 1. For securing the work piece to the beam 22 during treatment in the machine there is provided a shaft 35 which is parallel to the beam and rotatable relative thereto and which is provided at its ends with two radially projecting arms 36 carrying between them a clamp rod 37 which may be swung from the position shown in FIGURE 2 to the position indicated in broken lines adjacent the head of arrow A in FIGURE 3. In this latter position the clamp bar is disposed inside the channel formed by an angle iron 40 secured to the beam. A gear wheel 41 is secured to the shaft 35 and meshes with a gear rack 42 which is secured to and forms an extension of the piston rod 43 of a hydraulic jack, the cylinder 44 of which is mounted on one of the arms 23 carrying the beam 22. When pressure medium is supplied to the cylinder 44 the clamp rod 37 carried by the arms 36 will be swung from the position shown in FIGURE 2 in the direction indicated by the arrow A in FIGURE 3 to the position indicated at the head of the arrow. The clamp rod 37 will be returned to the initial position by means of the coil spring 50 shown in FIGURE 1. This spring is secured at one end to the supporting frame and has its other end connected to a wire 51 which lies around a cam 52 secured to the shaft 35, said cam having the form of a segment of a circle.

A reciprocating movement is imparted to the beam 22 by a reversible electric motor 45 which, by the intermediary of a transmission mechanism, drives a shaft 46 parallel to the cylinder 1 and rotatably journalled in the supporting frame, two gear wheels 47 being secured to said shaft. Each of the gear wheels 47 meshes with one of two gear racks 48 each pivotally connected at one end with one of the arms 33 carrying the beam 22.

The above-described machine operates in the following manner.

The initial positions of the various parts of the machine are shown in FIGURE 2. The work piece 20 is laid out on the blanket 21 and one edge portion of the work piece is placed in the channel of the angle iron 40. Thereafter, the clamp rod 37 is swung by means of the jack 43, 44 down into the channel of the angle iron 40 for clamping the work piece thereto, and the electric motor 45 then imparts a movement to the beam 22 carried by the arms 23 in a direction towards the cylinder 1. The opposite edge portion of the work piece will then pass on to the bolster 8 and will be moved into the space between the bolster and the rotating cylinder 1. At the same time, the bolster 8 will be moved by means of the jack 16, 17 towards the cylinder 1, and will keep the work piece pressed against the cylinder while the work piece is subjected to repeated treatments by the cylinder 1 during the reciprocating movement of the beam 22. After termination of the treatment the beam 22 will be stopped in the position shown in FIGURE 2 and the clamp rod will be swung back to the position shown in that figure. After the work piece has been removed another work piece is placed on the blanket and the operation described is repeated.

The machine is preferably equipped with means (not shown in the drawings) for adjusting the stroke of the beam 22 in accordance with the dimensions of the work pieces and also with means automatically interrupting the reciprocating movement of the beam in the position shown in FIGURE 2 after any desired number of strokes.

The invention is not limited to the embodiment hereinbefore described and as shown in the drawings, said embodiments being susceptible of modifications with respect to its details without departing from the basic concept of the invention. Thus, the weight 33 acting on the wind-up cylinder 26 for the blanket 21 may be replaced by a spring, and the mechanism for imparting a reciprocating movement to the beam 22 may be modified in several ways.

In machines wherein the cylinder 1 has a relatively high working temperature and wherein each skin is treated for several strokes of the reciprocating mechanism, it may be of advantage to vary the strokes of the beam 22 in such a manner, that, at the turning points, different portions of the skin will be acted upon by the cylinder 1, for the purpose of preventing local overheating of the skin.

What I claim is:

1. In a machine for treating the hair side of skins, which machine has a rotatable cylinder having an uneven circumferential work-contacting surface and a cooperating presser element adjacent said cylinder to support the work piece against said cylinder, the improvement comprising a transverse member mounted in the machine for movement toward and away from said cylinder and said presser element, means reciprocating said transverse member toward said cylinder and said presser element at a velocity considerably lower than the peripheral velocity of said cylinder, a blanket for supporting a work piece and feeding it onto said presser element, said blanket having one end secured to said transverse member and the opposite end located adjacent said presser element so that the leading end of a work piece will transfer from said blanket to said presser element, clamping means at the transverse member end of said blanket for clamping one end of a work piece to the blanket, and means secured to said opposite end of said blanket to maintain said blanket under tension.

2. In a machine for treating the hair side of skins, as claimed in claim 1, said means secured to said blanket opposite end consists of a rotatably mounted shaft, a wind-up cylinder onto which said blanket passes, secured to said shaft, a wind-up drum secured to said shaft, a wire extending around said drum and connected thereto and means tending to pull said wire from said drum.

3. In a machine for treating the hair side of skins, as claimed in claim 1, said reciprocating means consists of a beam, a pair of parallel arms having said beam secured to one end thereof and a pair of coaxial pins mounted parallel to said cylinder and each having the other end of one of said arms pivotally mounted thereon.

4. In a machine for treating the hair side of skins, as claimed in claim 1, said reciprocating means consists of a beam, a pair of parallel arms having one of their ends pivotally mounted and their opposite end secured to said beam positioning the same parallel to said cylinder, a pair of gear racks each pivotally connected at one end to one of said arms, a pair of gear wheels each meshing with one of said racks and reversibly driven means connected to said gear wheels for rotating the same in opposite directions.

5. In a machine for treating the hair side of skins, as claimed in claim 1, said reciprocating means consisting of a beam and driven means positioning said beam parallel to said cylinder and pivotally supporting the same for movement to and from said cylinder and said clamping means consists of a clamp bar swingably mounted on said beam in parallel relation thereto and means for swinging said clamp bar as desired.

References Cited by the Examiner
UNITED STATES PATENTS

| | | | |
|---|---|---|---|
| 2,328,643 | 9/43 | Hart | 69—27 |
| 2,713,785 | 7/55 | Friedman | 69—27 |
| 2,784,477 | 3/57 | Schaab | 69—27 X |
| 3,114,957 | 12/63 | Schaab et al. | 69—27 |

JORDAN FRANKLIN, *Primary Examiner.*